(12) United States Patent
DeLange et al.

(10) Patent No.: US 7,350,830 B1
(45) Date of Patent: ***Apr. 1, 2008

(54) PRESSURE RELIEVED THREAD CONNECTION

(75) Inventors: Richard W. DeLange, Kingwood, TX (US); Woodward A. Taylor, Everson, WA (US); Curtis J. Parker, Orange, TX (US)

(73) Assignee: Grant Prideco, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/029,055

(22) Filed: Jan. 3, 2005

Related U.S. Application Data

(63) Continuation of application No. 10/335,823, filed on Jan. 2, 2003.

(51) Int. Cl.
*F16L 25/00* (2006.01)
(52) U.S. Cl. .......................................... 285/334; 285/13
(58) Field of Classification Search ................. 285/333, 285/334, 332.2, 333.3, 13
See application file for complete search history.

(56) References Cited

U.S. PATENT DOCUMENTS 2,177,100 A * 10/1939 Frame ......................... 285/334
4,830,411 A   5/1989 Tsuru et al.
6,050,610 A   4/2000 Enderle et al.
6,481,760 B1 * 11/2002 Noel et al. ................... 285/334
2004/0155465 A1   8/2004 Noel et al.

* cited by examiner

*Primary Examiner*—David Bochna
(74) *Attorney, Agent, or Firm*—Browning Bushman P.C.

(57) ABSTRACT

Lubricant escape passages are formed in the threads used to connect one tubular body to another. The passages conduct trapped thread lubricant out of the threaded area to prevent the creation of high lubricant pressure that may damage or cause improper make up of the threaded connection. The passages may be grooves in the crests of the thread teeth and/or may be corner bevels on the thread teeth. In a conductor pipe or other pipe assembly using axially spaced internal and external seals at each axial end of the threaded area, the escape passages form a helical flow path through the engaged thread area. The external seal prevents the entry of corrosive fluids into the threaded area and the internal seal prevents leakage through the threaded area from within the conductor pipe. When the lubricant pressure increases excessively during assembly or impact loading of the connection, the lubricant escapes past the seals to prevent connection damage. When used with a wedge or other metal-to-metal thread engaging designs, the escape passages may be interrupted at some point intermediate their helical path to provide a pressure seal at the point of interruption. Relieving trapped lubricant from a wedge thread connection permits consistent final makeup positions that ensure optimal pressure sealing.

16 Claims, 3 Drawing Sheets

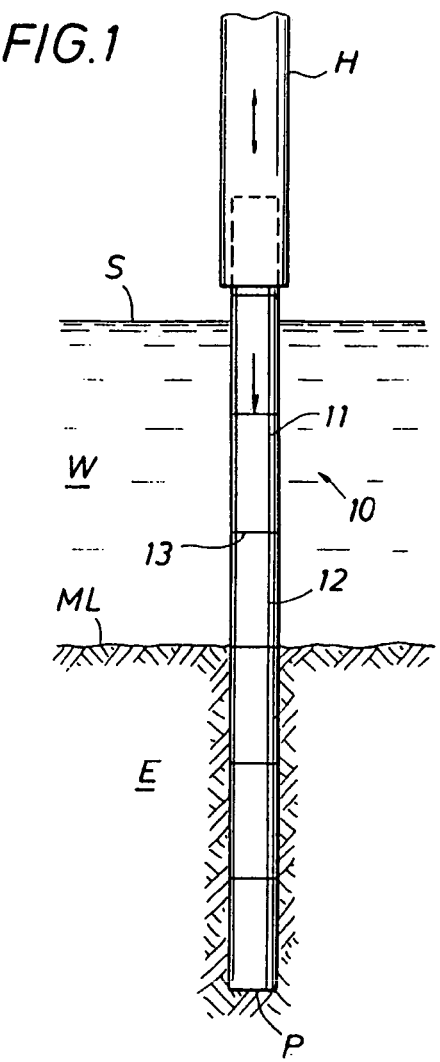
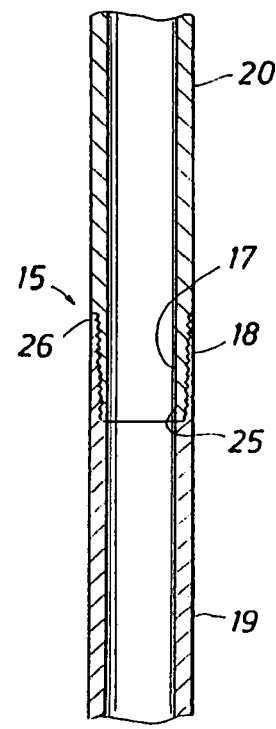
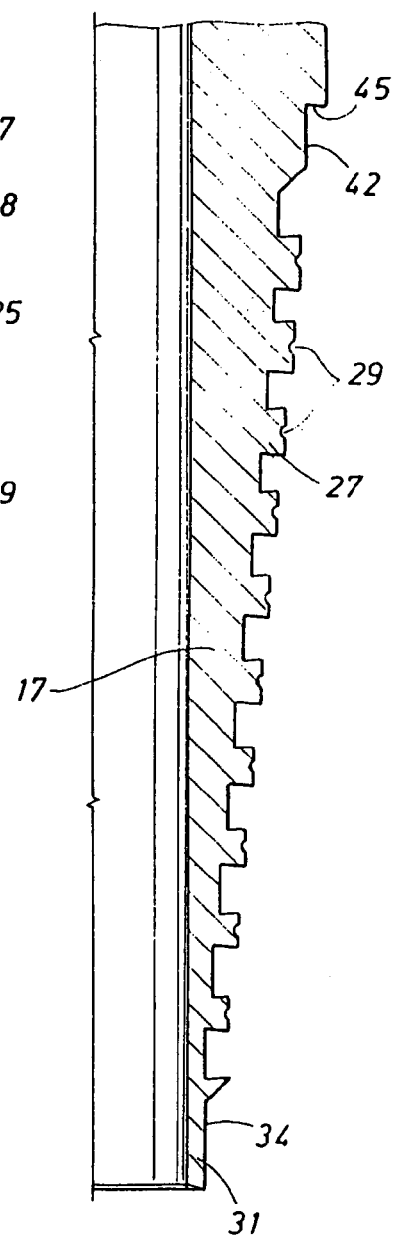
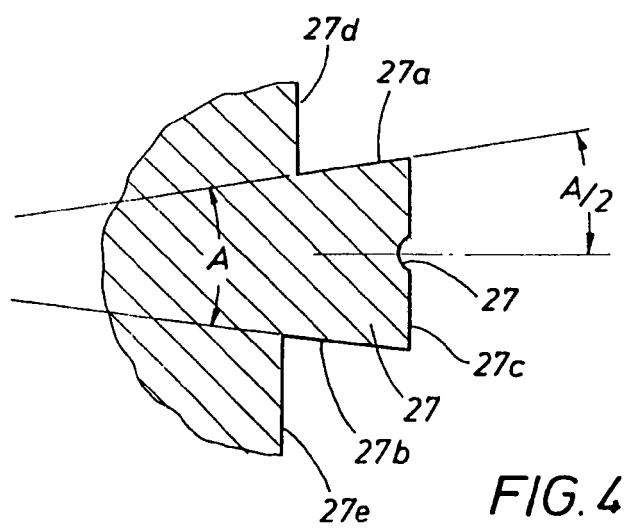

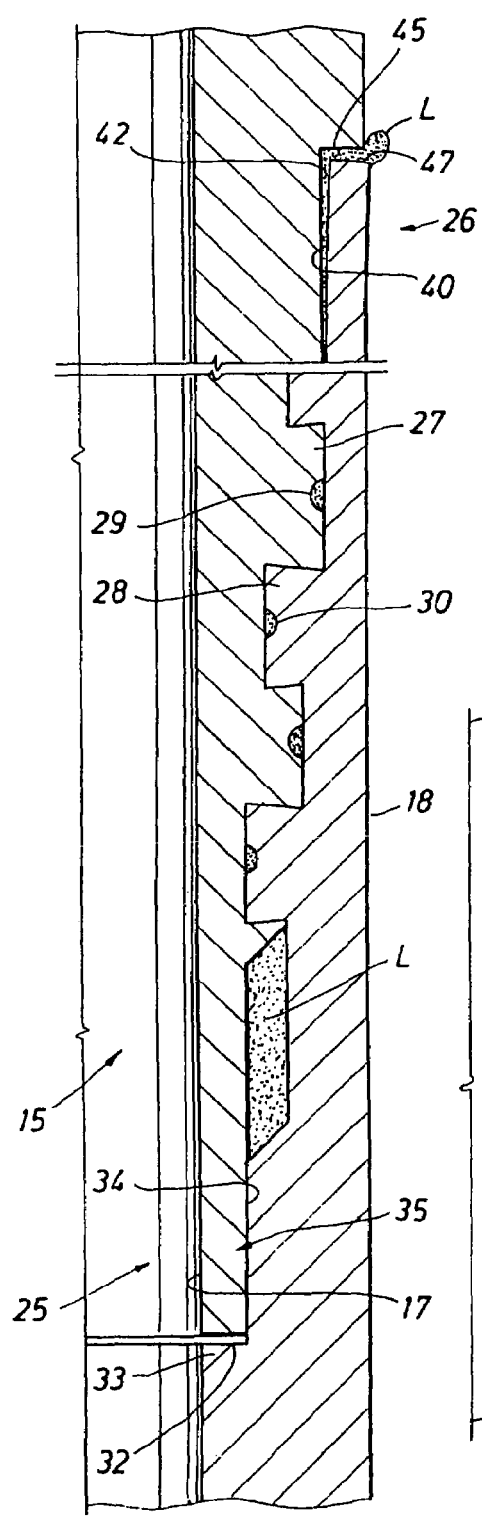
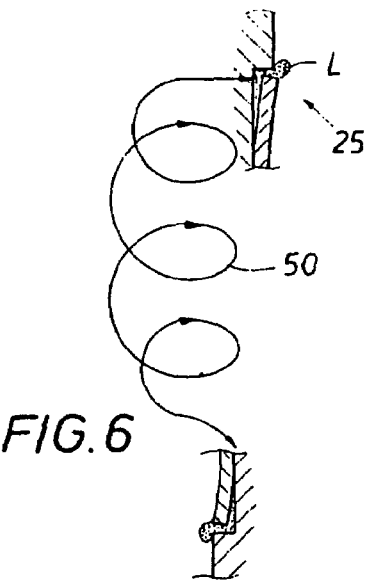
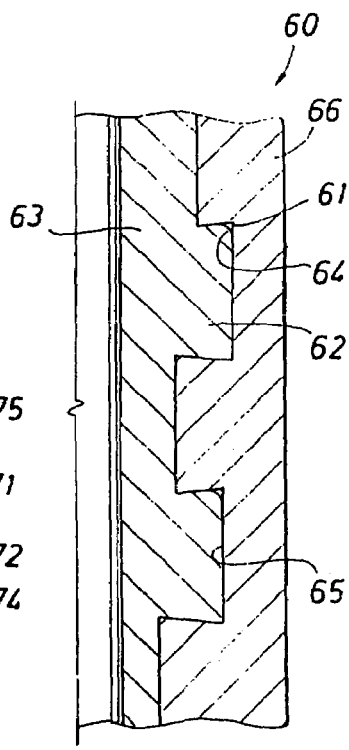
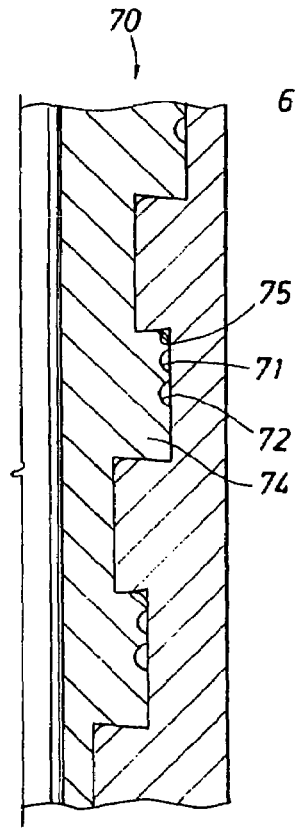
FIG. 5
FIG. 6
FIG. 7
FIG. 8

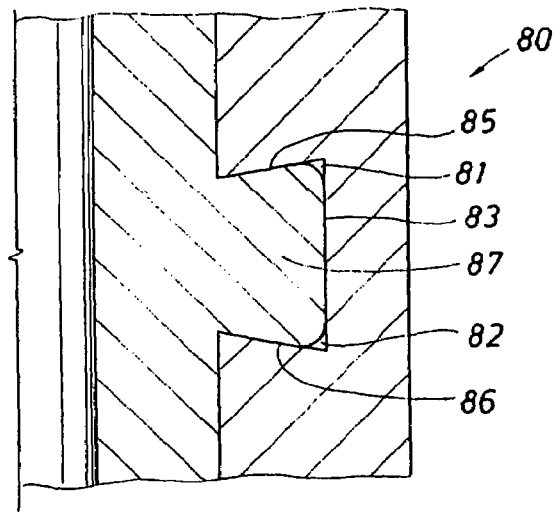
FIG.9
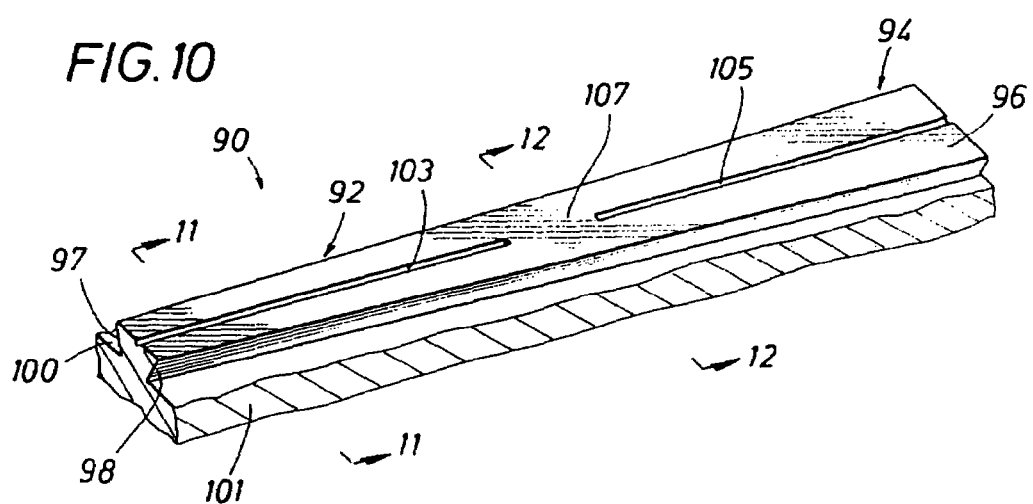
FIG.10
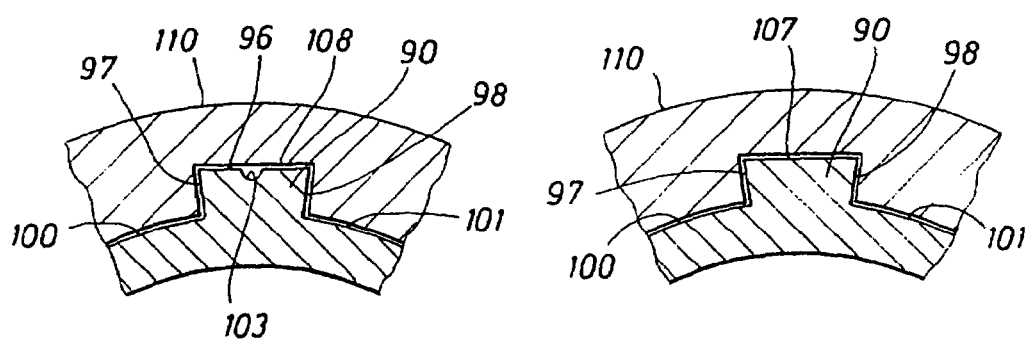
FIG.11
FIG.12

PRESSURE RELIEVED THREAD CONNECTION

CROSS REFERENCE TO RELATED APPLICATIONS

This application is a continuation of U.S. patent application Ser. No. 10/335,823 filed Jan. 2, 2003, for Pressure Relieved Thread Connection, the disclosure of which is incorporated herein by reference.

FIELD OF THE INVENTION

The present invention relates generally to threaded connectors. More specifically, the present invention relates to the connection together of threaded tubular bodies wherein high pressures may be developed in the lubricant trapped in the overlapping threaded area connecting the bodies. In one specific application, the present invention relates to threaded connections in tubular bodies where the connection makeup process and/or impact loading of assembled connections produce damagingly high pressures in trapped lubricant within the overlapping threaded area of the connected members. In another specific application, the invention relates to thread lubricant trapped in connections using wedge-type threads.

BACKGROUND SETTING OF THE INVENTION

Pipe is inserted into the earth to perform tasks that are as diverse as the simple job of establishing building footings to the more complex task of constructing a deep offshore well. The pipe may be jetted into place using a washing or jetting action, it may be drilled into the earth by rotating a bit or auger at the base of the pipe, it may be lowered into a pre-drilled bore hole or it may be pounded into the earth by repeated impact blows. Other methods of inserting pipe into the earth may also be employed.

As applied to well construction, the pipe may be used to drill the well, to case the well, to complete the well, to flow effluent from the well or to workover the well. Most pipe used in the construction of a well is formed into a long pipe string by securing together individual pipe sections, or "joints", using some form of a threaded connector. The connector is typically in the form of an externally threaded member, sometimes referred to as a "pin" that is threadedly received within an internally threaded member, sometimes referred to as a "box". The box may be integrally formed at one end of the pipe section or may be provided by the threaded engagement of a coupling with a pin formed at the end of the pipe section. In securing pipe sections together, a pin formed at an end of one pipe section is engaged within the box provided at an end of another pipe section. The type of thread used in the connector is determined primarily by the use to which the pipe is to be put.

Threaded pipe connections are usually assembled with the assistance of a thread lubricant that is applied to the threaded area to be engaged by the connection of the mating tubular bodies. The lubricant protects threads from corrosion and prevents galling and other mechanical thread damage during the assembly of the connection. In some connections, the lubricant also seals helical leakage paths formed between the engaged threads of the pin and box to make the threaded connection pressure-tight.

While the thread lubricant performs essential purposes in threaded connectors, its presence in certain types of threaded connections can also present problems. Some thread forms can trap the lubricant between the engaged surfaces of the pin and box threads. Assembly procedures and impact loading can also compress the trapped thread lubricant causing extremely high hydraulic forces that can damage the threaded connection. The presence of trapped lubricant in the pin and box can also prevent the threaded connection from being screwed together sufficiently to reach its optimum make up position.

Certain desirable thread designs and thread forms are not readily employed in applications where trapped thread lubricant may be subjected to high pressures. Wedge threads, dovetail threads, hooked threads and other complex thread forms that are well suited to perform desired mechanical holding and sealing functions in a threaded connector may be unsuitable for use in applications where trapped thread lubricant may become highly pressurized during the assembly or use of the connection.

Highly pressurized lubricant can also be problematic in the connectors used to assemble impact driven conductor pipe. Wells drilled in offshore bodies of water typically require the use of an external conductor pipe that extends from the floor of the body of water up to the drilling structure at the water surface. In deep waters, the conductor pipe is often installed by a process called "jetting", which uses pumped fluids to remove enough soil to allow the conductor pipe to be lowered to the desired depth below the water bottom ("mud line"). Axial shock loading or impact are not typically applied to the pipe when the conductor pipe is jetted into place. Jetting, however, is not always an available method of installing the conductor pipe.

Offshore wells drilled from jack-up and platform rigs typically employ a conductor pipe that is driven to the desired depth or point of refusal by hammering on the pipe with large diesel or hydraulic hammers. As many as 30,000 or more hammer blows may be required to drive the conductor pipe 300 ft. below the mud line. Each hammer blow can apply up to 3 million lbs. of force to each connection making up the conductor string.

The conductor pipes used in constructing offshore wells are assembled from individual joints of pipe connected together at their ends by welding or by threaded connections. Weld lines are well able to withstand the high, cyclic impact delivered by the hammers because of the solid-state nature of welds. However, threaded or other mechanical connections used to secure conductor pipe sections together are not inherently resistive to repetitive, impact loading. Threaded connections to be used in these applications must be specially designed to withstand high, cyclic loading because of the stress risers inherently required to create the metal thread configuration providing the mechanical connection. The industry has addressed fatigue failures in threaded conductor drive pipe by expressly designing the connections with larger dimensions and stronger materials to withstand high fatigue resistance.

High Internal connection pressure within conventional impact driven conductor pipe has not typically been a problem because sealing of the connector against high Internal pipe pressures was not usually required. Historically, the conductor pipe string has not been subjected to applied internal pressure because the pipe string has been open at each of its ends, which affords little chance of any significant differential pressure developing between the outside and inside of the pipe. For this reason, conductor pipes are not typically designed to withstand pressure differentials that may exist across the conductor wall.

Trapped lubricant in the described prior art conductor pipe thread connectors has not been a limiting consideration.

However, as wells have become more challenging, the probability of a "kick" occurring in the conductor pipe has increased. Such a kick may occur, for example, when the conductor pipe is driven into an abnormally pressured zone. This circumstance, as well as others, may require that the conductor pipe be designed to withstand and contain a high internal gas charge. Accordingly, conductor pipe used in offshore wells currently being drilled must be able to endure high, cyclic impact loads while maintaining a seal that can contain high pressures. This combination of problems is of recent origin, having a genesis coincident with the advent of deeper, more challenging offshore drilling.

Two major types of pressure seals are incorporated into the connections used to join large diameter conductor pipe: metal-to-metal radial seals and polymer O-rings. Some threaded large diameter connectors used in conductor pipe are equipped with an external polymer O-ring seal to restrict migration of seawater into the threaded area of the connection where it can cause corrosion or corrosion cracks to develop. Such corrosion in the connectors of conductor pipes is to be carefully avoided as it can behave as a stress riser that in turn may cause the fatigue life of the connection to be reduced.

In conductor seals intended to contain pressure, the metal-to-metal radial seal design is the preferred method of sealingly a conductor pipe. For this reason, metal-to-metal radial seals are commonly specified by the oil company customer for use in the construction of the conductor pipe.

While a metal-to-metal seal is a desirable feature for producing a pressure seal in conductor pipe, it is not universally found in such pipe. Moreover, while there are some conductor pipes that use an external elastomeric seal to restrict migration of seawater into the connection threads where it could cause corrosion or allow corrosion cracks to develop, the use of metal-to-metal seals for both an internal and external seal is not a common feature of conductor pipe design. Stress induced by the hydraulic loading of lubricant trapped in the connections of conductor pipe is a relatively new phenomenon resulting from the use of metal-to-metal internal and external seals. Accordingly, there has been little industry attention directed to the problem of pressurized thread lubricant trapped between internal and external seals on impact driven conductor pipe.

Metal-to-metal radial seal designs are well known in the broad field of oilfield tubulars. The metal-to-metal radial seal may be employed at one or both axially spaced ends of the engaged threaded area of the connection. The seal used to seal against the high-pressure fluids inside the tubular is generally referred to as an "internal" seal. A seal used at the opposite end of the engaged threaded connection used to seal fluids external to the threaded connection from entry into the threaded area is generally referred to as an "external" seal. Conductor pipe connections designed to provide pressure tight seals using both internal and external metal-to-metal seals have an increased probability of encountering damaging stresses produced as a result of having high-pressure trapped lubricant in the connections.

When the threaded connection has both an internal and an external seal, thread lubricant becomes trapped between the overlapping threaded areas of the connection as the connection is initially screwed together. This trapping action occurs as a result of the internal and external seals engaging before the threaded connection has been completely closed together.

The thread lubricant used for the threaded portions of the conductor connections is typically an oil-based grease compound containing solid particles. The thread lubricant compound is virtually non-compressible. Trapping an excessive amount of the thread compound between the internal and external seals can generate an enormous amount of hydraulic pressure between the pin and box as the volume containing the trapped fluid is decreased during the thread engagement process.

High impact loads applied during hammering of a conductor pipe are transferred across the engaged threads and can also produce high hydraulic pressures between the components of the connection. The impact induced hydraulic pressure in the thread lubricant is produced as a result of the required tight mechanical engagement between the mating threads of a conductor pipe connection. The tight thread engagement is necessary to resist relative movement between connected pipe sections during the repeated impacts driving the pipe into the earth. The tighter the connection, the more closely the connection resembles a solid tubular body which can best withstand the effects of the cyclic loading.

The stresses from impact loading as well as the stresses induced by high hydraulic pressures between the connection components can cause a failure of the threaded connection in a conductor pipe. Accordingly, stress control is extremely important in the design and construction of threads that must maintain a high degree of resistance to fatigue failure or other damaging effects of cyclic loading.

As contrasted with conductor pipe, a different set of performance and application requirements exists for the threaded connections of casing pipe that is run downhole into a well. Casing, unlike large OD conductor and conductor casing, is required to carry high loads but is not typically subjected to cyclic loading. Casing must also contain much higher pressures than are seen in conductor pipes. Pressure integrity must be maintained between the inside and outside of the casing. Typically, this pressure sealing is accomplished in the connections by incorporating metal-to-metal sealing elements. Simple tight fitting thread forms do not offer adequate sealing when the pressures are high, especially when high temperatures are present.

In many applications, "wedge" threads provide a superior connection for conductor pipe, casing and other tubulars. Casing connections with thread forms that wedge together have been available to the industry for over 20 years. The thread tooth on a wedge thread increases in width along its helical length. The gap between adjacent turns of a wedge thread tooth decreases in a direction opposite to the thread tooth increase. During assembly of wedge threads, the narrow end of the thread tooth of one component advances into an increasingly narrowing gap between thread teeth in the mating component. At full make-up, the thread tooth of one pipe component is wedged into the gap between thread tooth turns of a second pipe component to form a metal-to-metal engagement.

Wedge-type thread designs have not generally replaced traditional premium or high performance thread designs even though the wedging type thread forms offer superior torsional and compression strength. One reason for this lack of universal acceptance by the end users of the pipe is that the wedging thread forms have uncontrollable makeup characteristics. That is, the pin and the box of the connections rarely make up to the same final position relative to each other. This is a very detrimental characteristic when trying to engage metal seal elements on the pin and the box because these elements are typically designed on a slight taper. Therefore, if they are not accurately positioned relative to each other, they will not perform adequately when exposed to very high pressures.

The problem of unpredictable pin and box positioning when using wedging thread forms is due to several factors. One factor is the naturally occurring variations in the thread form shape along the entire helical length of the thread tooth body. This can be controlled to a certain extent by using high quality threading machines and special care in programming the machines. Another factor relates to the tight fit between the pin and box thread forms typical in connection designs that use wedging threads. This tight fit can entrap lubricant to the extent that the lubricant can't escape during the makeup procedure, which can cause a hydraulic layer of lubricant to be trapped between the pin and box threads. When this happens, the connection is further restricted from proper makeup position, which further hinders the proper engagement of the sealing elements.

A related problem resulting from trapping lubricant within a threaded connection is that the hydraulic forces in the lubricant resulting during makeup prevent the pipe assembly process from being accurately monitored. Most makeup monitoring systems evaluate the amount of torque being applied to a connection as a function of the relative rotation between the components being screwed together. The presence of trapped thread lubricant in the connection can produce an abnormal torque reading relative to the made up position of the connection.

The problem of trapped thread lubricant is dealt with, in part, in the connection of U.S. Pat. No. 4,830,411 (the '411 patent) by shaving the stab flank of the thread form to provide a helical flow passage that allows the escape of the trapped lubricant. The '411 patent also suggests providing a lubricant escape passage by removing a portion of the corner where the stabbing flank face and thread crest meet. Other thread features are also disclosed for preventing undesired makeup effects caused by trapping thread lubricant in the threaded area of the connection. The connection design of the '411 patent is intended for use in connections having an internal metal-to-metal seal and no external seal whereby the trapped lubricant may escape through the external, unsealed end of the connection. The thread modifications taught by the '411 patent can compromise the efficiency of a threaded connection, particularly those connections in which engagement of the thread flanks is an essential part of the thread design.

Another design directed toward stress reduction resulting from trapped lubricant is described in U.S. Pat. No. 6,050,610 (the '610 patent). The '610 patent suggests forming a groove in a thread root or at the intersection of a thread root with a thread flank to provide an escape passage for trapped lubricant. Formation of a recess in the root area of a thread can, however, concentrate stresses acting on the threaded connection, adversely affecting its strength.

Another prior art patent suggesting the use of grooves formed in a thread tooth or a thread root is U.S. Pat. No. 2,177,100 (the '100 patent). The '100 patent suggests the use of helical grooves in thread flanks or thread roots to provide line contact with the mating threads to provide a seal against root-to-crest-to-root leakage. Neither an internal nor an external metal-to-metal seal is proposed and lubricant contained in the grooves is said to provide a seal of the helically developed flow path formed by the grooves.

SUMMARY OF THE INVENTION

The threaded connections securing pipe sections together are modified to allow high-pressure, trapped thread lubricant to flow out of the overlapping threaded area of the connections. As the threaded connections are being made up, trapped pressurized thread lubricant escapes from the threaded area to prevent generation of damaging hydraulic forces and/or to enable the connection to reach its desired make up position. In connections having internal and external seals, high pressure thread lubricant trapped between seals is allowed to escape through the seals without sacrificing the sealing effectiveness of seals in preventing the ingress of external corrosive fluids or in containing pressure within the pipe.

The present invention provides one or more escape passages in the threaded connection of a pipe whereby lubricant over-pressurized by the effects of assembling the connection, or from impact loading of an assembled connection, is forced through the escape passages to exit the threaded area of the connection.

Grooves formed at the approximate midsection of the thread tooth crests provide a desired escape passage without reducing flank area contact of the engaged thread and without introducing significant stress risers in the thread form. In a modified form of the invention, the escape passage is formed by a bevel formed at the intersection of the thread tooth crest and the thread tooth flank. Both grooves and bevels may be used in the same connection to provide multiple flow passages.

Forming grooves in the thread teeth, rather than in the thread roots, provides the desired escape passage for trapped lubricant without introducing stress risers in the engaged components of the connection.

Forming the escape passage by bevelling the thread tooth has the advantage of providing the desired flow passage by modifying only the pin or box component of the connection.

The thread crest, however, is a preferred location for the fluid conductive groove of the present invention. The thread crest is subjected to a very low stress as compared with the thread flanks and root. Placing the lubricant flow groove in the thread crest rather than bevelling the crest-flank junction or grooving the thread root achieves a minimal alteration of thread component ratings. Wide ranges of groove depth are also possible when using the crest groove without adversely affecting the thread component ratings.

Providing an external seal that allows the escape of compressed thread lubricant while preventing the ingress of seawater protects the threaded area of the connection from pressure induced damage while simultaneously protecting the connection from the effects of salt-water corrosion.

One application of the present invention is for large diameter pipes that are connected together to form a conductor pipe string that is hammered into the earth. In forming such a pipe string, threaded pins and threaded boxes are used as connectors for adding pipe segments to the conductor pipe string as it is being hammered into place. Radial metal-to-metal pressure seals are provided at each axial end of the engaged threaded area of each pin and box connection. The internal seal resists pressure from the area within the conductor string. The external seal resists the entry of seawater into the engaged threaded area of the conductor. The escapes passages of the present invention conduct trapped lubricant from the overlapping threaded area of each connection, allowing it to escape through the internal and external seals without compromising the water and pressure sealing action of the seals.

A preferred form of the invention used with conductor pipe employs a dovetail engagement of the pin and box threads. The dovetail engagement of the threads has a superior ability to transfer impact-induced tension or compression loads across the engaged thread area. A conduit for fluid flow is formed by cutting a groove along the crest of the pin thread tooth. The groove creates a helical flow passage between the crest-root interface of the engaged threads. Where the thread design traps thread lubricant between the crest of the box thread tooth and the pin thread root, a second groove may be provided in the crest of the box thread tooth.

When designed for use with an American Petroleum Institute (API) modified thread lubricant that contains solid particles no greater in diameter than approximately 0.006 in., the groove radius cut in the thread crest is selected to produce a spacing between the groove-to-root interface that forms an escape passage having a minimum diametrical cross sectional dimension of 0.007 in. Creation of the escape passage with diametrical cross sectional dimensions greater than the largest diametrical cross sectional dimension of the largest solid particle of the thread lubricant ensures that the thread lubricant will not become impacted in the passage. The corner of a pin or box thread tooth may also be beveled to provide a single passage between the bevel surface and the root-to-flank surface of the mating components that can transport fluid trapped by the box thread crest or the pin thread crest. Where a thread tooth is to be beveled to form the desired passage, the pin thread tooth rather than the box tooth is preferably beveled.

In all embodiments of the invention, the escape passage dimensions are large enough to accommodate the maximum particle size of the solid materials in the lubricant. Sizing the escape passages to be larger than the largest solid particles in the lubricant enhances the ability of the compressed lubricant to flow through the escape passages and out of the connection without imposing damaging stresses in the connection.

Depending upon the amount of fluid to be moved through the escape passage, multiple grooves may be cut in the crest of the thread teeth or a single large diameter groove may be cut in the thread tooth crest.

The helical grooves cut into the thread crest may be generated by adding a specifically sized dimple to the threading insert used to cut a groove or grooves along the crest planes during the threading operation. Alternatively, the groove(s) may be formed by using a machining insert or tool to create the groove(s) prior to the threading passes or immediately after the threading passes are complete.

In the bevel form of the present invention, when the connection is fully connected together or "made-up", a helical conduit is created permitting lubricant to flow through the thread area, from one end to the other of the connection. While the cross sectional dimensions of the escape conduit should be greater than the largest dimension of the solid particles in the fluid, the conduit dimensions are desirably maintained as small as possible to ensure a maximum amount of thread flank contact area for resistance to mechanical loading, especially cyclic impact loads.

The bevel of a thread corner for a connector of the present invention may also be created by modifying the threading inserts or by employing a different machine tool to bevel the thread corner after it has been generated by a lathe. Most pin thread forms are designed and machined to have a radius on both sides of the thread crest. Adding a bevel edge to the threaded insert (on one or both sides of the edge that generates the crest) permits the bevel to be easily generated during the threading passes.

Using the fluid conduit on casing connections that incorporate wedging thread forms minimizes the possibility of trapping lubricant during the makeup process. By creating a leak path for the excess lubricant, the wedging connections makeup more consistently. Eliminating trapped lubricant allows both the pin and box to consistently makeup to the proper position so the pin and box sealing elements will have the proper relative position to thereby maximize the metal seal's pressure sealing capability.

One embodiment of the present invention is a connection design that incorporates a wedging thread form with the pressure sealing elements located in the center region of the connection. This arrangement allows the fluid escape conduits to offer maximum flow characteristics because there are no seals at the ends of the connection, which is typically where the seals are located. It will be appreciated that connections with internal and external seals at the ends instead of in the center region of the connection, will also benefit from the lubricant escape passage designs of the present invention.

From the foregoing, it will be appreciated that an important object of the present invention is to provide a thread design and method for preventing the development of high hydraulic pressures within the threaded connections of tubular pipe sections.

Another object of the present invention is to provide a thread design and method for relieving hydraulic pressure buildup in the threaded area connecting two components where the threaded connection has an internal and an external seal at opposite ends of the threaded area.

Yet another object of the present invention is to provide a thread design and method for flowing a high-pressure thread lubricant contained in a threaded area securing two components together toward areas external to said threaded area while maintaining a seal preventing entry of fluid and/or pressure from said external areas into said threaded area.

Yet another object of the present invention is to provide flow passages in the space between axially extending, overlapping threaded areas whereby fluid contained in such areas may escape to an area axially beyond the threaded areas to prevent the development of undesired high hydraulic pressure acting against the threaded areas.

A further object of the present invention is to provide flow passages that have the capacity to conduct conventional, API thread lubricant from the engaged thread area securing tubular members to each other.

It is also an important object of the present invention to provide a thread design for use in connecting together the ends of conductor pipe that can withstand the effects of cyclical, high impact loading while maintaining structural integrity and sealing capability. A related object of the present invention is to provide a connection that can disperse the high-pressure hydraulic forces generated in a thread lubricant as a result of cyclical impact loading of a threaded connection.

Yet another object of the present invention is to provide lubricant flow passages through the threaded area connecting the ends of tubulars by forming grooves and/or corner bevels on the surface of a thread tooth in the threaded area.

It is an important object of the present invention to provide lubricant conducting grooves in the surface of thread teeth at a location that produces a minimum reduction in the contact area between adjacent flanks of engaged thread teeth to enhance the ability of a threaded connection to withstand cyclic impact loading.

An object of the present invention is to provide easily manufactured fluid conduit passages on the surfaces of thread teeth for providing a path for high-pressure thread lubricant to escape the engaged threaded area connecting tubular bodies.

Another object of the present invention is to provide a connector for securing together the ends of conductor drive pipe sections wherein external and internal metal-to metal seals are provided at opposite axial ends of an axially extending threaded area securing the two sections together whereby high pressure thread lubricant is conducted out of the threaded area to prevent overstressing of the threaded connection.

Yet another object of the present invention is to provide a thread design and method for use with wedge threads whereby thread lubricant in the thread engagement area between connected pipe components is conducted out of the engagement area to permit consistent connection make ups.

It is also an object of the present invention to provide a thread design and method for conducting trapped lubricant from a central seal area of a wedge thread connection to optimize the sealing characteristics of the connection.

Another object of the present invention is to provide a metal-to-metal seal in a wedge thread connection that is free from the effects of trapped thread lubricant.

A specific object of the present invention is to provide a threaded connection having a lubricant flow passage formed by a beveled corner and/or a crest groove in a wedge thread tooth that can conduct lubricant from a central area along the development of the thread tooth to an end area of the thread tooth whereby the central area can provide a pressure seal in the threaded connection.

Yet another object of the present invention is to provide a method and thread form that release trapped thread lubricant to facilitate accurate monitoring of the assembly of threaded connections employing such thread form.

The foregoing objects, features and advantages of the present invention, as well as others, will be more fully understood and better appreciated by reference to the following drawings, specification and claims.

BRIEF DESCRIPTION OF THE DRAWINGS

FIG. 1 is an elevation, partially in section, illustrating a conductor pipe of the present invention being hammered into the earth through the mud line underlying a body of water;

FIG. 2 is a cross sectional view illustrating a threaded connection of the present invention securing together two sections of conductor pipe;

FIG. 3 is a cross sectional view illustrating an externally threaded pin section of a connector of the present invention having a single helical groove along the crest of the thread tooth for forming an escape passage for conducting a thread lubricant;

FIG. 4 is an enlarged detailed cross sectional view depicting details in the positioning of an escape flow passage groove in the crest of a pin thread tooth;

FIG. 5 is an enlarged cross sectional view illustrating engaged pin and box components with helical flow passages cut into the crests of the pin thread tooth and the box thread tooth;

FIG. 6 is a schematic illustration depicting a helical escape path for high-pressure lubricant flow extending axially across a threaded area;

FIG. 7 is an enlarged cross sectional view illustrating a form of the present invention wherein a helical flow passage is provided between engaged pin and box components by bevelling a corner of the pin thread;

FIG. 8 is an enlarged cross sectional view illustrating a form of the present invention wherein a thread tooth corner bevel and multiple grooves formed in the thread tooth crest of a pin connection provide multiple helical passages for high-pressure thread lubricant flow through the engaged threaded area between a pin and box;

FIG. 9 is an enlarged cross sectional view illustrating a form of the invention in which dual bevels are provided on a pin thread tooth to provide two helical flow passages for the escape of pressurized thread lubricant;

FIG. 10 is a perspective view of a wedge thread as it would appear rearranged from its normal helical configuration on a pin thread and stretched out into a linear form;

FIG. 11 is a partial cross sectional view of the wedge thread of FIG. 10, taken along the line 11-11 of FIG. 10, received within a mating box thread groove;

FIG. 12 is a partial cross sectional view of the wedge thread of FIG. 10, taken along the line 12-12 of FIG. 10, received within a mating box thread groove.

DESCRIPTION OF THE ILLUSTRATED EMBODIMENTS

A conductor pipe string of the present invention is indicated generally at 10 in FIG. 1. The top end of the pipe string 10 is engaged by a hammer H that is being operated above the surface S of a body of water W. A mud line ML is at the interface between the earth E and the water body W. The string 10 is driven into the earth in reaction to repeated impact blows delivered by abrupt reciprocating movement of the hammer H.

The conductor pipe string 10 is constructed from the assembly of a number of conductor pipe sections such as the sections 11 and 12 connected together at their ends 13 to make a string of pipe that extends below the mud line ML to a desired subsurface point P. The point P may be the design depth for the well construction or may be the point of refusal at which the pipe can no longer be driven into the earth. As thus far described, the conductor pipe and installation process are conventional.

FIG. 2 of the drawings illustrates a form of a threaded connector of the present invention, indicated generally at 15, having features that enhance the connector for use in impact driven conductor pipe. The connector 15 includes a pin member 17 engaged in a box member 18. The pin 17 is formed at the end of a tubular pipe section 20 and the box member 18 is formed at the end of a tubular pipe section 19.

The material employed in the construction of the connection 15 and the attached body sections 19 and 20 is selected to withstand the structural requirements and environmental exposure of a specific well construction. The wall thickness and internal and external diameters of the connection 15 and the associated pipe segments 19 and 20 are selected to meet the design criteria for the well to be drilled through the driven conductor pipe formed from the conductor components. Conductor pipes in offshore well construction may have external diameters of 60 in. or more and lengths that may extend many hundreds of feet. Carbon steel or a steel alloy is commonly used in the construction of the tubular components of the conductor pipe.

The connector 15 is provided with an internal, circumferentially extending, metal-to-metal seal 25 and an external, circumferentially extending metal-to-metal seal 26. Before the assembly of the conductor pipe sections, the threads of the pin 17 and the threads of the box 18 are typically coated with a grease based, metallic solids-containing thread lubricant, such as an API modified thread lubricant. While the features of the present invention are described for connections using a common solids containing thread lubricant, the problems associated with trapped lubricant can also be present with solids-free liquid lubricants such as grease or oil. To the extent the present invention is effective in reducing problems arising from trapped solids-containing lubricants, it is even more efficient in handling problems associated with trapped, solids-free lubricants.

The lubricated pin 17 is introduced into the lubricated box 18 and rotated to engage the threads of the two pipe sections to each other. Before the threads become fully engaged, the internal seal 25 and the external seal 26 engage and resist lubricant flow out of the overlapping threaded area between the pin and box.

As the pin is rotated to complete full engagement with the box, any thread lubricant trapped between the internal and external seals 25 and 26 is forced into a progressively decreasing volume of space defined between the seals and the pin and box threads. The decreasing volume causes the pressure of the trapped lubricant to increase substantially.

Because of the virtual non-compressability of the liquid lubricant, if the lubricant cannot escape the connection, enormous hydraulic pressure may be generated as the pin and box are screwed together. If unrelieved, the induced hydraulic pressure forces the box and pin surfaces away from each other and imposes potentially damaging structural stresses on the connection.

FIG. 3 of the Drawings illustrates details in the construction of the pin 17 of the present invention. It will be appreciated that a cross section of the box 18 (not illustrated) is complementary to that of the Box 17. A pin thread tooth 27 extends helically along the outer threaded surface of the pin 17. FIG. 4 is an enlarged detailed cross sectional view of the pin thread tooth 27.

Referring jointly to FIGS. 3 and 4, a lubricant escaped groove 29 is positioned in the crest of the tooth 27. The groove 29 forms a helical escape path: along the helical thread form to permit trapped lubricant to flow toward the axial ends of the thread tooth 27.

The thread tooth 27 is illustrated as having a load flank 27a, a stab flank 27b and a crest 27c set between roots 27d and 27e. Where the thread flanks 27a and 27b are inclined relative to each other as illustrated in FIG. 4, they define an included angle indicated at "A". The cross sectional center of the groove 29 is formed at the intersection of the bisector A/2 of angle A with the thread tooth crest 27c. Depending on the inclination angles of the flanks 27a and 27b, the groove 29 may be positioned intermediate the thread flanks without necessarily being equally distant from the thread flanks. The described placement of the groove 29 establishes an objective measure for construction of the groove at a location that will not compromise the load bearing ability of a thread tooth having differently inclined flanks.

The presence of the groove 29 in the thread crest 27c increases the surface area of the thread crest and functions to direct hydraulic forces from the trapped lubricant toward the thread tooth flanks 27a and 27b to enhance the sealing effectiveness of a connection using the thread form. In a preferred embodiment of the thread form used in a dovetail wedge thread, the groove 29 may cut with a radius of 0.04700 in. to produce a groove depth below the thread crest of 0.01200 in. The angle of the load flank 27a may be approximately 3 degrees and the angle of the stab flank 27b may be approximately 1 degree. FIG. 5 is an enlarged view illustrating details in the operation of the internal and external seals of the connection 15 of the present invention. The pin 17 and box 18 are illustrated in FIG. 5 in their fully engaged, made up position. Reference may be made to the disengaged pin 17 illustrated in FIG. 3 to assist in understanding the illustration of FIG. 5 depicting the pin and box engaged.

With reference to FIG. 5, pin thread teeth 27 and box thread teeth 28 are illustrated with grooves 29 and 30, respectively, formed in the thread teeth crests. The grooves 29 and 30 preferably have a semi-circular cross-section to minimize sharp corners that may act as stress risers.

The internal seal 25 is formed by engagement of an outer annular surface 34 on the pin nose 31 with an annular internal surface 35 formed at the base of the box threads. The surfaces 34 and 35 may be tapered or otherwise configured to provide a metal-to-metal seal between the pin and box at the full make-up position of the connector 15.

The external seal 26 is provided by the engagement of an internal annular surface 40 formed adjacent the face of the box 18 with an external annular surface 42 formed on the box, adjacent the base of the pin threads. The external seal 26 is illustrated permitting high-pressure lubricant L to escape from the threaded area of the connector. When the lubricant pressure rises sufficiently, the seal surfaces 40 and 42 are forced apart by the pressure to allow the lubricant to escape from the engaged threaded area of the connection. The distortion of the components allowing lubricant escape has been exaggerated for purposes of illustration. While the external seal 26 is illustrated as permitting the lubricant to escape, the internal connector 25 is illustrated sealing to prevent the lubricant from escaping into the conduit. Such a condition would exist, for example, when the distribution of the fluid pressure across the threaded area of the connection was not uniform.

In a preferred embodiment, the differential pressure between the trapped thread lubricant and the areas external to the sealed threaded area required to separate the metal-to-metal seals is approximately 500 psi.

The escape passages formed by the grooves 29 and 30 transcribe a helical path for flow of the lubricant out of the threaded area as indicated schematically in FIG. 6.

The external and internal seal areas depicted at 25 and 26 function to ensure that overpressured thread lubricant L can escape the threaded area through the seals while the seals remain effective to withstand the ingress of pressure or water into the threaded area when the pressure within the threaded area is below that external to the seals.

FIG. 7 of the drawings illustrates a connection of the invention, indicated generally at 60, in which a helical lubricant escape flow passage 61 is provided by forming a bevel on a pin thread tooth 62 of a threaded pin 63. Formation of a bevel on the pin thread tooth is a simple machining procedure that provides the desired escape passage between the pin and box threads economically and efficiently. The passage 61 is formed within the normally closed tolerance fit between the crest and root of engaged pin and box threads by forming a bevel 64 at the intersection of the flank and crest of the pin thread tooth 62. The helical passage 61 is thus formed within the confines created between a root 65 of a threaded box section 66 and the external surface of the pin thread tooth 62.

The bevel of a thread corner for a connector of the present invention may be created by modifying the threading inserts or by employing a different machine tool to bevel the thread corner after it has been generated by a lathe. Most pin thread forms are designed and machined to have a radius on both sides of the thread crest. Adding a bevel edge to the threaded insert (on one or both sides of the edge that generates the crest), permits the bevel to be easily generated during the threading passes.

FIG. 8 illustrates a modified form of the Invention, indicated generally at 70, in which multiple helical grooves 71 and 72 are formed in the crest of a pin thread tooth 74.

The intersection between the crest and a flank of the tooth 74 is beveled at 75 to provide a third flow passage for overpressured lubricant.

FIG. 9 illustrates a modified form of the Invention, indicated generally at 80, in which flow passages 81 and 82 are formed at either side of a thread tooth crest 83. The flow passage 81 is formed by a bevel spanning between the thread flank 85 and the crest 83. The flow passage 82 is formed by a bevel that spans between the thread flank 86 and the crest 83. The bevels are preferably formed on a pin thread 87, however, the bevels may be provided on a thread tooth of the box.

FIG. 10 illustrates a straightened out, dovetail, wedge type thread tooth, indicated generally at 90, equipped with lubricant escapes passage of the present invention. The thread tooth 90 is suitable for use in a wedge-thread that produces a pressure seal intermediate the ends of the engaged threads. For purposes of illustration, the thread tooth 70 is illustrated as it would appear if removed from its helical position on a pin and stretched into a linear form. The thread tooth 90 extends from a narrow end 92 to a broad end 94. The tooth 90 includes a crest 96 that extends between inclined flanks 97 and 98. Thread roots 100 and 101 are formed adjacent of the flanks 97 and 98, respectively. An internal escape groove 103 and an external escape groove 105 are formed approximately centrally along the thread crest 96. The escape groove 103 and the escape groove 105 are separated from each other by an ungrooved seal area 107.

FIG. 11 illustrates a cross section of a portion of a connector illustrating the thread tooth 90 received within a gap 108 between thread teeth of a box 110. The internal escape groove 103 is illustrated providing an escape passage for the trapped lubricant between the pin tooth crest 96 and the box thread gap 108.

Trapped lubricant in the connection between the pin and box is allowed to flow through the escape passage provided by the groove 103 and exit into the internal confines of the pipe sections joined by the connection. Lubricant trapped in the connection closer to the wider end 94 of the connection flows through the groove 105 where it may exit the connection into the water or other environment surrounding the connector.

FIG. 12 illustrates the formation of a metal-to-metal seal between the thread tooth 90 and the gap 108. The gaps illustrated in FIG. 12 between the thread tooth and the thread configuration of the surrounding box are exaggerated for purposes of illustration. The presence of the ungrooved section 107 in the thread tooth 90 permits the pin of the wedge-thread connection to form a metal-to-metal seal with the box of the connection. The fluid escape grooves 103 and 105 of the connection permit trapped thread lubricant to flow out of the connection so that the metal-to-metal seal may consistently be made up to the same position between the pin and box.

While a preferred form of the invention has been described in detail herein, it will be appreciated that many variations thereof may be made without departing from the spirit and scope of the Invention which is more fully defined in the following claims.

The invention claimed is:

1. A pin and/or box thread connector having a fluid flow passage for use in relieving fluid pressure in a thread lubricant containing solid particles contained between threads of a pin and box in an engaged connection comprising a groove cut in a crest of a thread of said pin and/or said box, said groove following the helical path of said crest and having dimensions configured to conduct said thread lubricant without reducing contact forces between the engaged threads in said connection, said groove being cut in said crest approximately midway between thread flanks on either side of said crest, said groove providing an escape passage for said thread lubricant allowing flow of thread lubricant through said groove and having a diametrical cross sectional dimension whose smallest value is greater than the largest diametrical cross sectional dimension of the largest of said solid particles in said thread lubricant.

2. A thread connector as defined in claim 1 wherein said groove includes an arcuate cross section.

3. A connector as defined in claim 2, further comprising:
   a thread tooth formed by a load flank and a stab flank on either side of said crest, and
   a bevel connecting a flank of said thread with said crest of said thread tooth for forming a second fluid flow passage for use in relieving fluid pressure contained between threads in an engaged connection.

4. A connector as defined in claim 3, further comprising multiple grooves formed in said thread crest.

5. A connector as defined in claim 3, further comprising a second bevel connecting a flank of said thread with said crest of said thread tooth.

6. A thread connector as defined in claim 1, further comprising:
   a thread tooth formed by a load flank and a stab flank on either side of said crest,
   said load flank having a surface inclined to a central axis of said connector at a load flank angle,
   said stab flank having a surface inclined to a central axis of said connector at a stab flank angle, and
   said groove cut at a point on said crest at an intersection of said crest with a bisector of an angle defined by an intersection of a line lying within said load flank surface and a line lying within said stab flank surface.

7. A thread connector as defined in claim 6 wherein at least a portion of each of said load flanks and said stab flanks is inclined to said central axis at an angle greater than 90 degrees.

8. A thread connector as defined in claim 6 wherein at least a portion of each of said load flank and said stab flank is inclined to said central axis at an angle less than 90 degrees.

9. A thread connector as defined in claim 1 wherein said threads comprise wedge threads.

10. A thread connector as defined in claim 1 wherein said threads comprise dovetail wedge threads.

11. A connector as defined in claim 1, further comprising multiple grooves formed in said thread crest.

12. A connector as defined in claim 1 wherein said lubricant escape passage has no diametrical cross sectional dimensions smaller than 0.006 in.

13. A thread connector as defined in claim 1 further comprising internal and external metal-to-metal seals formed at axially spaced areas adjacent said engaged threaded area.

14. A thread connector having a fluid flow passage for relieving fluid pressure in a thread lubricant containing solid particles contained between rigid, substantially inflexible, pin and box thread teeth engaged in a connected pin and box, comprising a bevel surface formed at the intersection of a thread crest and a thread flank of one of said pin thread tooth or said box thread tooth whereby a first flow passage for said thread lubricant may be formed between said bevel surface and a thread root-to-flank intersection of said box thread tooth or said pin thread tooth, respectively, a groove in said thread crest, said groove following a portion of the helical path of said thread crest, said groove forming a second flow passage for said thread lubricant allowing flow of thread lubricant through said groove, said groove being approximately midway between thread flanks on either side of said crest, said first or second fluid flow passage having no diametrical cross sectional dimensions smaller than 0.006 in.

15. A thread connector as defined in claim 14 further comprising a continuous annular seal area intermediate axial ends of said thread teeth devoid of said first fluid flow passage for forming a metal-to-metal seal between said thread teeth.

16. A thread connector as defined in claim 14 further comprising continuous annular internal and external metal-to-metal seals adjacent axially spaced ends of said pin and box threads.

* * * * *